US012391059B2

(12) United States Patent
Lee et al.

(10) Patent No.: US 12,391,059 B2
(45) Date of Patent: Aug. 19, 2025

(54) FORGERY PREVENTION APPARATUS TO PREVENT DELAMINATION AND FORGERY AUTHENTICATION METHOD USING THE SAME

(71) Applicant: NBST CO., LTD., Gyeonggi-do (KR)

(72) Inventors: In Sook Lee, Gyeonggi-do (KR); Ju Young Lee, Gyeonggi-do (KR)

(73) Assignee: NBST CO., LTD., Gyeonggi-Do (KR)

( * ) Notice: Subject to any disclaimer, the term of this patent is extended or adjusted under 35 U.S.C. 154(b) by 136 days.

(21) Appl. No.: 18/215,923

(22) Filed: Jun. 29, 2023

(65) Prior Publication Data

US 2024/0001704 A1 Jan. 4, 2024

(30) Foreign Application Priority Data

Jul. 1, 2022 (KR) ........................ 10-2022-0081296

(51) Int. Cl.
*B42D 25/47* (2014.01)

(52) U.S. Cl.
CPC .................................... *B42D 25/47* (2014.10)

(58) Field of Classification Search
CPC ........... B32B 29/08; B32B 3/28; B42D 25/30; B42D 25/40; B42D 25/45; B42D 25/465; B42D 25/47; G03H 1/00; G03H 1/0005; G03H 1/0011; G09F 3/02
See application file for complete search history.

(56) References Cited

U.S. PATENT DOCUMENTS 8,025,239 B2 * 9/2011 Labrec .................... G06K 19/06 283/67
10,406,845 B2 * 9/2019 Rhyner ................ B42D 25/355
10,875,350 B2 * 12/2020 Yamada ............... B42D 25/351
11,977,938 B2 * 5/2024 Sugihara .............. G02B 5/1852
2012/0305646 A1 * 12/2012 Schweikart ........... G09F 3/0292 235/494
2024/0001704 A1 * 1/2024 Lee ........................ B42D 25/47

FOREIGN PATENT DOCUMENTS

CN 113002205 A * 6/2021 .............. B41M 1/12
CN 113085400 A * 7/2021 .............. B41M 1/12

* cited by examiner

*Primary Examiner* — John R Lee
(74) *Attorney, Agent, or Firm* — The PL Law Group, PLLC

(57) ABSTRACT

An anti-counterfeiting apparatus is capable of preventing delamination between layers laminated in an anti-counterfeiting device through a structural color expressed by a load and images formed by the structural color. The anti-counterfeiting apparatus may include a first layer formed of a flexible material and including a high-corrugation region and a low-corrugation region, a second layer formed on an upper portion of the high-corrugation region in a pattern, to be adhered to the first layer, and formed of a material having a Young's modulus greater than that of the first layer, and a third layer adhered to the first layer to cover the low-corrugation region and the second layer, and formed of a material having a Young's modulus greater than that of the first layer and a Young's modulus smaller than that of the second layer.

11 Claims, 3 Drawing Sheets

FORGERY PREVENTION APPARATUS TO PREVENT DELAMINATION AND FORGERY AUTHENTICATION METHOD USING THE SAME

CROSS REFERENCE TO RELATED APPLICATIONS AND CLAIM OF PRIORITY

This application claims the benefit under 35 USC § 119 of Korean Patent Application No. 10-2022-0081296 filed on Jul. 1, 2022, in the Korean Intellectual Property Office (KIPO), the entire disclosure of which is incorporated herein by reference for all purposes.

BACKGROUND

1. Field of the Invention

The present invention relates to an anti-counterfeiting apparatus to prevent interlayer delamination and an anti-counterfeiting authentication method using the same, and more particularly, to an anti-counterfeiting apparatus capable of preventing delamination between layers laminated in an anti-counterfeiting device through a structural color expressed by a load and images formed by the structural color, and an anti-counterfeiting authentication method using the anti-counterfeiting apparatus.

2. Description of the Related Art

A variety of new products have been developed according to the development of technologies, and transactions of the developed products have been actively conducted online. However, unfortunately, since great progress in reproduction technology has also been made, it is becoming difficult to distinguish between genuine and copy products. In the case of expensive products, various anti-counterfeiting technologies are applied thereto, but in the case of somewhat low-priced products which are unavoidable for mass distribution, there is a problem in that it is difficult to apply the anti-counterfeiting technology. Further, in the case of items such as food, medical supplies, cosmetics, and the like, because these are directly related to human health and even life, it seems that social interest in the anti-counterfeiting measure is required.

In the case of an anti-counterfeiting system to which a photonic crystal-based pattern is applied, which are commonly used among the anti-counterfeiting technologies, the pattern is always viewed in the presence of light, which is not suitable for hiding information. Thus, there are limitations in its use as the anti-counterfeiting system.

To this end, many developments have been made for a new way of anti-counterfeiting device having a rapid response to external stimuli (such as tension, compression, bending, torsion and the like).

In the case of the anti-counterfeiting device having a rapid response to the external stimulus, a layer formed by laminating a film having a predetermined rigidity on a flexible material may be embedded in the device to apply a load in a manner such as tension, compression, bending, twisting, and the like, thereby showing an image by a structural color that appears due to the applied load.

However, when an external pressure such as the above-described tensile load, compressive load, bending load, or torsional load is applied, delamination, in which an adhered portion between the film-shaped structure and the flexible material is separated, may occur, such that a technology to prevent this problem is required.

SUMMARY

An aspect of the present invention is to provide an anti-counterfeiting apparatus capable of preventing delamination between layers laminated in an anti-counterfeiting device through a structural color expressed by a load and images formed by the structural color, and an anti-counterfeiting authentication method using the anti-counterfeiting apparatus.

To achieve the above aspect, according to an aspect of the present invention, there is provided an anti-counterfeiting apparatus including: a first layer formed of a flexible material and including a high-corrugation region and a low-corrugation region; a second layer formed on an upper portion of the high-corrugation region in a pattern, to be adhered to the first layer, and formed of a material having a Young's modulus greater than that of the first layer; and a third layer adhered to the first layer to cover the low-corrugation region and the second layer, and formed of a material having a Young's modulus greater than that of the first layer and a Young's modulus smaller than that of the second layer.

In exemplary embodiments, the anti-counterfeiting apparatus may further include an adhesive layer configured to adhere the first layer, the second layer and the third layer, wherein the first layer, the second layer, the third layer and the adhesive layer satisfy Equation 2 below:

$$r > \frac{|X_i - d_n|}{\varepsilon_{Yi}} \quad \text{[Equation 2]}$$

(in Equation 2, $X_i$ is a distance between an outer surface of the first layer and a center plane in a thickness direction of each of the first layer, the second layer, the third layer and the adhesive layer, $d_n$ is a distance between the outer surface of the first layer and a neutral plane, $\varepsilon_{Yi}$ is a yield strain of each of the first layer, the second layer, the third layer and the adhesive layer, and r is a radius of curvature of the anti-counterfeiting apparatus).

In exemplary embodiments, the adhesive layer may include a first adhesive layer configured to adhere the first layer and the second layer, and a second adhesive layer configured to adhere the first layer and the third layer.

In exemplary embodiments, the distance $d_n$ between the outer surface of the first layer and the neutral plane may satisfy Equation 6 below:

$$d_n = \frac{\sum_i [K_i X_i Z_i]}{\sum_i [K_i Z_i]} \quad \text{[Equation 6]}$$

(in Equation 6, $X_i$ is the distance between the outer surface of the first layer and the center plane in the thickness direction of each of the first layer, the second layer, the third layer and the adhesive layer, $K_i$ is an elastic modulus of each of the first layer, the second layer, the third layer and the adhesive layer, and $Z_i$ is a thickness of each of the first layer, the second layer, the third layer and the adhesive layer).

In exemplary embodiments, the elastic modulus and the thickness of the first layer, the second layer, the third layer and the adhesive layer may be determined so that the neutral plane is located between the first layer and the third layer.

In exemplary embodiments, the first layer, the second layer, the third layer and the adhesive layer may satisfy Equation 7 below:

$$r > \frac{12R^2|X_i - d_n|}{\pi^2 Z_i^2} \quad \text{[Equation 7]}$$

(in Equation 7, $X_i$ is a distance between the outer surface of the first layer and a center plane in a thickness direction of a layer in which a delamination occurs ("delaminated layer"), $Z_i$ is a thickness of the delaminated layer, $d_n$ is a distance between the outer surface of the first layer and a neutral plane, R is a length of micropores of the adhesive layer, and r is the radius of curvature of the anti-counterfeiting apparatus).

In exemplary embodiments, when a plurality of adhesive layers are included, an average length of the micropores $R_m$ may satisfy Equation 10 below:

$$R_m = \pi Z_i \left( \frac{r_m}{12|X_i - d_n|} \right)^{1/2} \quad \text{[Equation 10]}$$

(in Equation 10, $X_i$ is the distance between the outer surface of the first layer and the center plane in the thickness direction of the delaminated layer, $Z_i$ is the thickness of the delaminated layer, $d_n$ is the distance between the outer surface of the first layer and the neutral plane, and $r_m$ is an average value of the curvature radii at the time of occurring the delamination when the anti-counterfeiting apparatus is bent).

In exemplary embodiments, a guide portion which may satisfy a condition for the radius of curvature r is formed on an upper portion of the third layer or inside the first layer.

According to another aspect of the present invention, there is provided an anti-counterfeiting authentication method using the anti-counterfeiting apparatus according to any one of claims 1 to 6, the method including: applying an external force so as to form corrugations in the second layer and the third layer; respectively forming corrugations having a wavelength of different sizes from each other in the second layer and the third layer while a buckling effect appears due to different stress distributions and surface strains of the respective layers depending on a difference in the Young's modulus; and determining whether there is forgery through images formed by expressing different structural colors due to incident lights in the high-corrugation region and the low-corrugation region on the first layer where grating structures of different shapes are formed by an arrangement of the corrugations.

According to the present invention, it is possible to prevent delamination between the layers laminated on an anti-counterfeiting device through a structural color expressed by a load and images formed by the structural color.

In addition, by setting the elastic modulus and the thickness of the layer formed in the anti-counterfeiting apparatus, it is possible to deduce a radius of curvature that prevents a delamination phenomenon from occurring, and apply a load as much as the radius of curvature.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION

The present invention may be altered in various ways and have various embodiments, and will be described with reference to the drawings for illustrating specific embodiments. However, the present invention is not limited to the specific embodiments, and it will be understood by those skilled in the art that the present invention is intended to cover all modifications, equivalents, and alternatives falling within the spirit and scope of the present invention.

Hereinafter, embodiments of the present invention will be described in detail with reference to the accompanying drawings.

Figure 1:
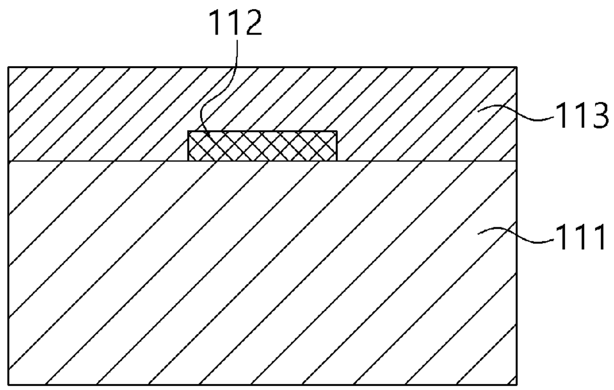
FIGS. 1 and 2 are cross-sectional views illustrating an anti-counterfeiting apparatus according to embodiments of the present invention, respectively.

FIG. 1 is a cross-sectional view illustrating an anti-counterfeiting apparatus according to an embodiment of the present invention.

An anti-counterfeiting apparatus 100 includes a first layer 111 formed of a flexible material and including a high-corrugation region and a low-corrugation region;

a second layer 112 formed on an upper portion of the high-corrugation region in a pattern, to be adhered to the first layer 111, and formed of a material having a Young's modulus greater than that of the first layer; and a third layer 113 adhered to the first layer 111 to cover the low-corrugation region and the second layer, and formed of a material having a Young's modulus greater than that of the first layer and a Young's modulus smaller than that of the second layer.

The first layer 111 may be formed by curing epoxy (EPU) on an upper surface of a substrate RB made of polyethylene terephthalate (PET), but it is not limited thereto. In addition, the first layer 111 may be made of polypropylene or a natural material having excellent flexibility, and is preferably made of a material further containing a plasticizer to further improve flexibility.

In addition, it is preferable to further include a process of preforming plasma treatment on the cured first layer 111 in order to strengthen interfacial bonding with the second layer 112 formed on the upper portion of the high-corrugation region of the first layer 111. The first layer 111 formed as described above preferably has a Young's modulus in a range of 10 to 20 Mpa.

Further, the first layer 111 preferably has a thickness of 200 to 300 μm.

If the thickness of the first layer 111 exceeds 300 μm, it is not easy to deform the shape thereof due to an external force, manufacturing costs are increased, and the thickness becomes thick, thereby making it unsuitable for use as a film. Furthermore, there is a disadvantage in that, when external stimuli, such as a stimulation due to bending are applied, the anti-counterfeiting apparatus is not bent well.

If the thickness of the first layer 111 is less than 200 μm, the anti-counterfeiting apparatus may be destroyed by the external stimuli due to reduced durability, and stability of a base material itself may be decreased. Thus, there is a disadvantage in that corrugations of random size rather than corrugations of uniform size may be formed during forming the corrugations, such that visibility of the pattern is deteriorated when the pattern is expressed on the surface of the film.

Next, the second layer 112 may be formed in a predetermined pattern by printing in the high-corrugation region of the upper surface of the first layer 111.

The second layer 112 is formed of a material having a hardness higher than that of the first layer 111, thereby, when the shape of the first layer 111 is deformed, corrugations (high corrugations) having a period (e.g., a distance between valleys) at a level of several to hundreds of micrometers are formed on the surface thereof in contact with the first layer 111 due to a difference in physical properties (high-corrugation region formation), and a grating structure is formed due to the arrangement of the corrugations. For example, the second layer 112 may be disposed on a region determined as the high-corrugation region.

In this case, for the second layer 112, it is preferable to use a material having a Young's modulus greater than that of the first layer 111, for example, in a range of 60 to 80 Gpa. However, since the numerical range for the Young's modulus values of the first layer 111 and the second layer 112 are merely suggested as a preferred numerical range, they are not limited thereto and may have various Young's modulus values including the corresponding numerical range. For example, according to the range of 10 to 20 Mpa, the preferred Young's modulus values of the first layer 111, and the range of 60 to 80 Gpa, the preferred Young's modulus values of the second layer 112, the following equation may be satisfied.

[1/8000≤Young's modulus of first layer 111/Young's modulus of second layer 112≤1/3000].

Then, the third layer 113 is formed of a material having a Young's modulus smaller than that of the second layer 112.

When the shape of the first layer 111 is deformed by an external force, corrugations (low corrugations) having a period (e.g., the distance between valleys) at a level of several to hundreds of nanometers are formed on the surface of the third layer 113 in contact with the first layer 111 due to a difference in physical properties (low-corrugation region formation), and a grating structure is formed due to the arrangement of the corrugations. For example, the third layer 113 may be disposed in a region determined as the low-corrugation region.

In addition, referring to the corrugation formation principle for forming the grating structure in the anti-counterfeiting apparatus 100 of the present invention, when an external force is applied to the flexible first layer 111 such that a bending load is applied in a direction of the third layer 113 and the second layer 112, corrugation arrangement patterns having a periodic width are formed in the third layer 113 and the second layer 112 by buckling type instability. These patterns formed as described above are generated due to mismatch in mechanical properties between the thin and rigid third and second layers 113 and 112 and the first layer 111 which is thicker and softer than the third and second layers 113 and 112.

Here, a periodicity λ of the corrugation arrangement is determined by thicknesses h and elastic moduli $E_f$ of the third layer 113 and the second layer 112 and an elastic modulus $E_s$ of the first layer 111 predicted through the linear buckling theory as shown in Equation 1 below.

$$\lambda = 2\pi h\sqrt[3]{E_f/3E_s} \qquad \text{[Equation 1]}$$

In Equation 1, $\overline{E}$ is a plane deformation coefficient and is defined as $E/(1-v^2)$, wherein v is the Poisson's ratio and E is the Young's modulus of the first layer 111, the second layer 112 or the third layer 113. This Equation 1 shows a model of surface periodic phenomenon and is able to predict the periodicity of the anti-counterfeiting apparatus 100. Specifically, in the anti-counterfeiting apparatus 100 of the present invention in which the third layer 113, the second layer 112 and the first layer 111 are combined, since the third layer 113 and the second layer 112 has a very high Young's modulus compared to the Young's modulus of the first layer 111, the third layer 113 and the second layer 112 may be regarded as film layers having stiffness, and a size (width) of each wavelength of the corrugations may be determined according to a relative difference in the Young's moduli (E) and a relative difference in the thicknesses h between the third and second layers 113 and 112 and the first layer 111.

Here, the corrugation arrangement patterns are formed differently because of the relative differences in Young's moduli E and thicknesses h of the first layer, the second layer and the third layer. Due to the above difference, a corrugation structure (in a micrometer unit) formed in the high-corrugation region where the second layer 112 is formed and a corrugation structure (in a nanometer unit) formed in the low-corrugation region where the third layer 113 is formed are different, and thereby, saturations of the structural colors and the images to be displayed are different from each other.

Figure 2:
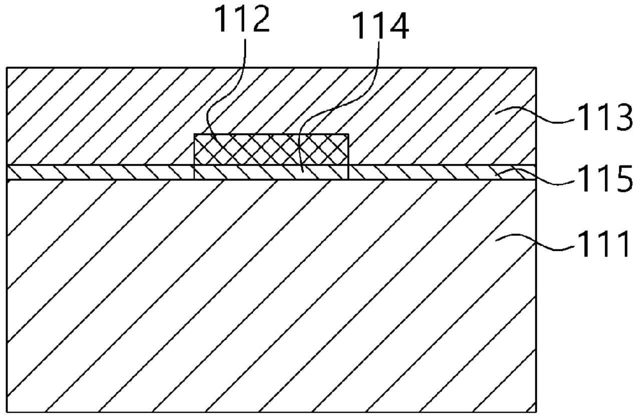

Next, as shown in FIG. 2, the anti-counterfeiting apparatus 100 may further include adhesive layers 114 and 115 formed on the first layer 111 so that the second layer 112 and the third layer 113 are adhered to each other. The second layer 112 is formed in a pattern on the upper portion of the high-corrugation region of the first layer 111, and may be mutually adhered thereto by the first adhesive layer 114 formed therebetween, and the third layer 113 may be adhered to the upper portion of the low-corrugation region of the first layer 111 by the second adhesive layer 115.

Further, in the present invention, in order to prevent a plastic delamination phenomenon in which the adhered second layer 112 or the third layer 113 is separated while an external pressure such as a bending load, a tensile load, or a compressive load is applied to the anti-counterfeiting apparatus 100 to which each of the above-described layers is adhered, the anti-counterfeiting apparatus according to the present invention may satisfy Equation 2 below.

$$r > \frac{|X_i - d_n|}{\varepsilon_{Y_i}} \qquad \text{[Equation 2]}$$

In Equation 2, $X_i$ is a distance between an outer surface of the first layer 111 and a center plane in a thickness direction of each of the first layer 111, the second layer 112, the third layer 113, and the adhesive layers 114 and 115 (preferably, in a micrometer (μm) unit), $d_n$ is a distance between the outer surface of the first layer 111 and a neutral plane (preferably, in a micrometer (μm) unit), $\varepsilon_{Y_i}$ is a yield strain of each of the first layer 111, the second layer 112, the third layer 113 and the adhesive layers 114 and 115, and r is a radius of curvature of the anti-counterfeiting apparatus (preferably, in a micrometer (μm) unit).

Figure 3:
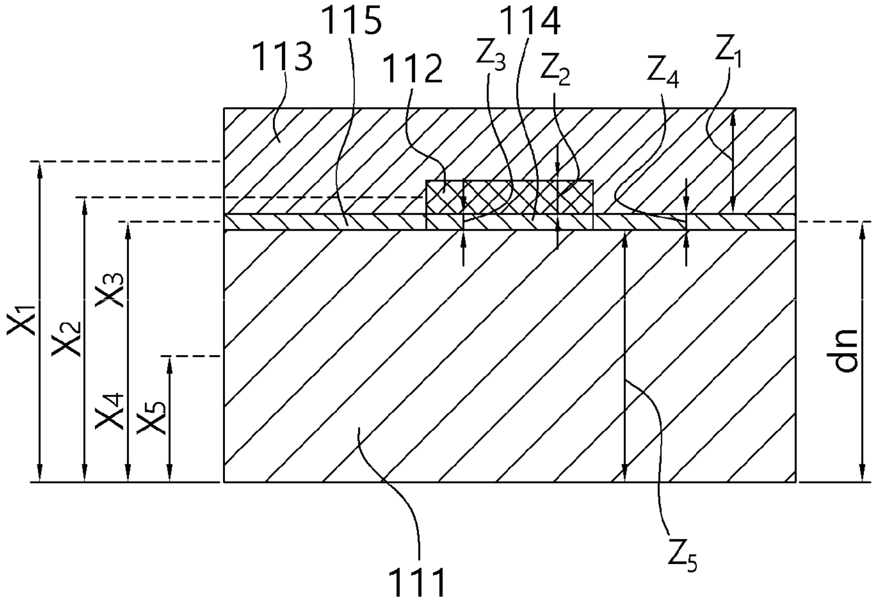
FIG. 3 is a detailed cross-sectional view illustrating the anti-counterfeiting apparatus according to an embodiment of the present invention.
Figure 4:
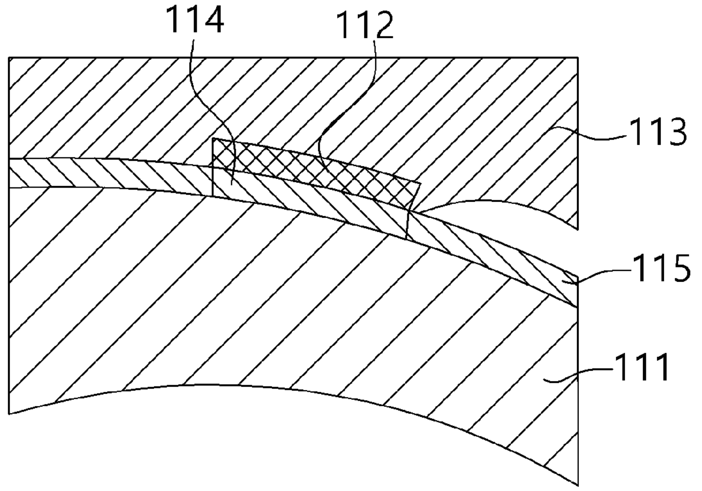
FIGS. 4 and 5 are cross-sectional views illustrating a state where interlayer delamination occurs while a load is applied to the anti-counterfeiting apparatus according to an embodiment of the present invention, respectively.
Figure 5:
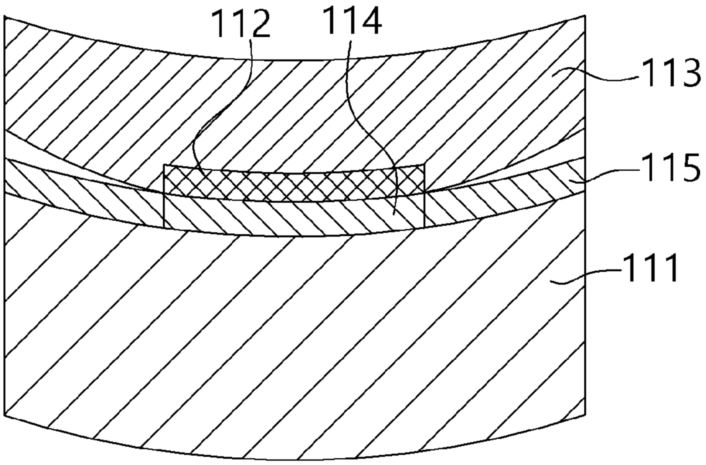

For example, as shown in FIG. 3, $X_1$ denotes a distance between the outer surface of the first layer 111 and the center plane in the thickness direction of the third layer 113, and $X_2$ denotes a distance between the outer surface of the first layer 111 and the center plane in the thickness direction of the second layer 112, $X_3$ denotes a distance between the outer surface of the first layer 111 and the center plane in the thickness direction of the first adhesive layer 114, $X_4$ denotes a distance between the outer surface of the first layer 111 and the center plane in the thickness direction of the second adhesive layer 115, $X_5$ denotes the outer surface of the first layer 111 and a center plane in the thickness direction of the first layer 111, $\varepsilon_{Y1}$ denotes the yield strain of the third layer 113, $\varepsilon_{Y2}$ denotes the yield strain of the second layer 112, $\varepsilon_{Y3}$ denotes the yield strain of the first adhesive layer 114, $\varepsilon_{Y4}$ denotes the yield strain of the second adhesive layer 115, and $\varepsilon_{Y5}$ denotes the yield strain of the first layer 111.

In the present specification, the neutral plane refers to a point having an average stiffness of all layers of the anti-counterfeiting apparatus 100.

When the anti-counterfeiting apparatus 100 is bent while a load is applied, more specifically, when the anti-counterfeiting apparatus 100 is bent so that the radius of curvature of the neutral plane thereof is to be r, a distance between the center plane of each layer and the neutral plane becomes $|X_i-d_n|$. In addition, a strain $\varepsilon_{i\_center}$ of the center plane of each layer is represented by Equation 3 below.

$$\varepsilon_{i\_center} = \frac{1}{r}|X_i - d_n| \quad \text{[Equation 3]}$$

In Equation 3, $X_i$ and $d_n$ are the same as $X_i$ and $d_n$ defined in Equation 2 above.

When the strain $\varepsilon_{i\_center}$ at the center plane of each of the first layer 111, the second layer 112, the third layer 113, and the adhesive layers 114 and 115 reaches the yield strain, $\varepsilon_{Yi}$, one half of the layer is elastically deformed, and the other half is plastically deformed.

Here, in order to prevent the delamination, it is safe from the delamination phenomenon if the strain $\varepsilon_{i\_center}$ at the center plane of each layer is smaller than the yield strain $\varepsilon_{Yi}$ of each layer.

Accordingly, even if a load such as a bending load is applied to the anti-counterfeiting apparatus 100, a range of a radius of curvature r of the neutral plane that can be bent without an occurrence of the delamination phenomenon is represented by Equation 4 below.

$$\varepsilon_{Yi} > \varepsilon_{i\_center} = \frac{1}{r}|Xi - dn| \quad \text{[Equation 4]}$$

Finally, the range thereof is defined as Equation 5 below.

$$r > \frac{|X_i - d_n|}{\varepsilon_{Yi}} \quad \text{[Equation 5]}$$

Accordingly, the radius of curvature r of the anti-counterfeiting apparatus 100 may be set in consideration of the elastic moduli and thicknesses of the first layer 111, the second layer 112 and the third layer 113, and the adhesive layers 114 and 115 so as to satisfy Equation 5. By adjusting these parameters, it is possible to apply a load as much as the radius of curvature r so as to prevent an occurrence of the delamination phenomenon.

In an exemplary embodiment, the distance $d_n$ between the outer surface of the first layer 111 and the neutral plane may satisfy Equation 6 below.

$$d_n = \frac{\sum_i [K_i X_i Z_i]}{\sum_i [K_i Z_i]} \quad \text{[Equation 6]}$$

In Equation 6, $X_i$ is the distance between the outer surface of the first layer and the center plane in the thickness direction of each of the first layer, the second layer, the third layer and the adhesive layers, $K_i$ is an elastic modulus of each of the first layer, the second layer, the third layer and the adhesive layers, and $Z_i$ is a thickness of each of the first layer, the second layer, the third layer and the adhesive layers.

Accordingly, the elastic modulus and the thickness of each layer may be determined so that the position of the neutral plane calculated by the above equation is located between the first layer 111 and the third layer 113 of the anti-counterfeiting apparatus 100.

Next, a method for preventing delamination from buckling deformation due to adhesive forces of the adhesive layers 114 and 115 will be disclosed. Conditions under which the delamination does not occur may vary depending on the adhesive force or adhered state of the adhesive layers 114 and 115, and accordingly, in order to prevent an occurrence of the delamination due to buckling, it is necessary to satisfy Equation 7 below.

$$r > \frac{12R^2|X_i - d_n|}{\pi^2 Z_i^2} \quad \text{[Equation 7]}$$

In Equation 7, $X_i$ and $Z_i$ are values for a layer in which a delamination occurs ("delaminated layer"), wherein $X_i$ is a distance between the outer surface of the first layer 111 and a center plane in a thickness direction of the delaminated layer, $Z_i$ is a thickness of the delaminated layer, $d_n$ is a distance between the outer surface of the first layer 111 and the neutral plane, R is a length of micropores of each of the adhesive layers 114 and 115, and r is the radius of curvature of the anti-counterfeiting apparatus 100.

In the present specification, the micropores refer to a peeled-off region caused by a delamination when the delamination occurs at an interface between different layers, and the length of micropores refers to a length of a long axis of the micropores.

Here, when the length of the micropores is R, in order to prevent the delamination due to buckling, the strain $\varepsilon_{i\_center}$ of the center plane of the second layer 112 or the third layer 113 should be smaller than a strain $\varepsilon_{buckling}$ when buckling occurs. From this relationship, the condition under which the delamination due to buckling ("buckling delamination") does not occur is represented by Equation 8 below.

$$\varepsilon_{i\_center} = \frac{|X_i - d_n|}{r} < \varepsilon_{buckling} = \frac{n^2\pi^2}{12R^2} * Z_i^2 \quad \text{[Equation 8]}$$

Here, since the number of buckling modes is one (n=1), a minimum radius of curvature r at which the buckling delamination does not occur should satisfy Equation 9 below.

$$r > \frac{12R^2|X_i - d_n|}{\pi^2 Z_i^2} \quad \text{[Equation 9]}$$

Here, when a plurality of layers are attached using a plurality of adhesive layers as in the second layer 112 and the third layer 113, an average length of the micropores $R_m$ may satisfy Equation 10 below.

$$R_m = \pi Z_i \left( \frac{r_m}{12|X_i - d_n|} \right)^{1/2} \quad \text{[Equation 10]}$$

In Equation 10, $X_i$ and $Z_i$ are values for the delaminated layer, wherein $X_i$ is the distance between the outer surface of the first layer 111 and the center plane in the thickness direction of the delaminated layer, $Z_i$ is the thickness of the delaminated layer, and $r_m$ is an average value of the curvature radii at the time of occurring the delamination when the anti-counterfeiting apparatus is bent.

As such, a minimum curvature value for preventing buckling may be obtained in a state where a single layer is attached to the first layer 111 as well as in a state where a plurality of layers are attached thereto.

Accordingly, it is preferable that a value of the radius of curvature r for preventing the plastic delamination as well as buckling delamination, and a load as much as the set value is applied to the anti-counterfeiting apparatus 100.

In an exemplary embodiment, a guide portion which satisfies a condition for the radius of curvature r may be formed on an upper portion of the third layer 113 or inside the first layer 111.

As described above, it is necessary to apply a bending load that satisfies the conditions for the radius of curvature to prevent the plastic delamination phenomenon and the radius of curvature to prevent the buckling delamination phenomenon, but there is a problem that it is difficult to meet the corresponding conditions for the radius of curvature without a separate guide.

Accordingly, the guide portion capable of satisfying the condition for the radius of curvature r may be formed on the upper portion of the third layer 113 to induce so that the condition for the radius of curvature to apply the bending load is satisfied.

In another embodiment, the guide portion is inserted into the first layer 111, and when a bending load is applied, the bending action may be naturally guided so as to satisfy the equation condition for the radius of curvature r, thereby minimizing an occurrence of the delamination phenomenon.

In addition, the second layer 112 is formed between the first layer 111 and the third layer 113 to form adhesive surfaces on both sides of the second layer 112, such that delamination may occur by the bending load in a most easy manner. Accordingly, the thickness of the second layer 112 is formed so as to have a relatively thin thickness under the condition for the radius of curvature r in which the delamination does not occur, thereby increasing the delamination prevention effect.

Further, in an anti-counterfeiting authentication method using the anti-counterfeiting apparatus, when applying an external force so as to form corrugations in the second layer 112 and the third layer 113, corrugations having a wavelength of different sizes from each other are respectively formed in the second layer 112 and the third layer 113 while a buckling effect appears due to different stress distributions and surface strains of the respective layers depending on a difference in the Young's modulus. The corrugations of the second layer 112 are formed to have a greater wavelength than the corrugations of the third layer 113, and different structural colors due to incident lights are expressed in the high-corrugation region and the low-corrugation region on the first layer 111 where grating structures of different shapes are formed by an arrangement of the corrugations. As a result, it is possible to determine whether there is forgery through images formed by expressing the different structural colors.

Even effects not described in the present specification, the above-described respective components included in the present invention may additionally have other effects, and new effects that cannot be obtained in the prior art may be deduced according to the organic coupling relationship between the above-described respective components.

In addition, the embodiments illustrated in the drawings may be modified and implemented in other forms, and when implementing by including the configuration defined in the claims of the present invention or implementing within the scope of equivalents, such modifications and implementations are duly included within the scope of the appended claims of the present invention.

What is claimed is:

1. An anti-counterfeiting apparatus comprising:

a first layer formed of a flexible material and including a high-corrugation region and a low-corrugation region;

a second layer adhered to the first layer, formed in a pattern on an upper portion of the high-corrugation region and formed of a material having a Young's modulus greater than that of the first layer;

a third layer adhered to the first layer to cover the low-corrugation region and the second layer, and formed of a material having a Young's modulus greater than that of the first layer and a Young's modulus smaller than that of the second layer; and an adhesive layer configured to adhere the first layer, the second layer and the third layer, wherein each of the first layer, the second layer, the third layer and the adhesive layer satisfies Equation 2:

$$r > \frac{|X_i - d_n|}{\varepsilon_{Yi}} \quad \text{[Equation 2]}$$

wherein $X_i$ is a distance between an outer surface of the first layer and a center plane of each corresponding layer, $d_n$ is a distance between the outer surface of the first layer and a neutral plane, $\varepsilon_{Yi}$ is a yield strain of each corresponding layer, and r is a radius of curvature of the anti-counterfeiting apparatus, and wherein the center plane bisects the thickness of each corresponding layer and the neutral plane has an average stiffness of all layers of the anti-counterfeiting apparatus.

2. The anti-counterfeiting apparatus according to claim 1, wherein the adhesive layer comprises a first adhesive layer configured to adhere the first layer and the second layer, and a second adhesive layer configured to adhere the first layer and the third layer.

3. The anti-counterfeiting apparatus according to claim 1, wherein the distance between the outer surface of the first layer and the neutral plane ($d_n$) satisfies Equation 6:

$$d_n = \frac{\sum_i [K_i X_i Z_i]}{\sum_i [K_i Z_i]} \quad \text{[Equation 6]}$$

wherein $X_i$ is the distance between the outer surface of the first layer and the center plane of each corresponding layer, which refers to one of first layer, second layer, third layer, and adhesive layer, $K_i$ is an elastic modulus of each corresponding layer, and $Z_i$ is a thickness of each corresponding layer.

4. The anti-counterfeiting apparatus according to claim 3, wherein the elastic modulus and the thickness of the first layer, the second layer, the third layer and the adhesive layer are determined so that the neutral plane is located between the first layer and the third layer.

5. The anti-counterfeiting apparatus according to claim 1, wherein each of the first layer, the second layer, the third layer and the adhesive layer satisfies Equation 7:

$$r > \frac{12R^2|X_i - d_n|}{\pi^2 Z_i^2} \quad \text{[Equation 7]}$$

wherein $X_i$ is a distance between the outer surface of the first layer and a center plane of a delaminated layer in which a delamination occurs, $Z_i$ is a thickness of the delaminated layer, $d_n$ is a distance between the outer surface of the first layer and a neutral plane, R is a length of micropores of the adhesive layer, and r is the radius of curvature of the anti-counterfeiting apparatus, wherein the center plane bisects the thickness of each corresponding layer and the neutral plane has an average stiffness of all layers of the anti-counterfeiting apparatus.

6. The anti-counterfeiting apparatus according to claim 5, wherein, when a plurality of adhesive layers are comprised, an average length of the micropores $R_m$ satisfies Equation 10:

$$R_m = \pi Z_i \left( \frac{r_m}{12|X_i - d_n|} \right)^{1/2} \quad \text{[Equation 10]}$$

wherein $X_i$ is the distance between the outer surface of the first layer and the center plane of the delaminated layer, $Z_i$ is the thickness of the delaminated layer, $d_n$ is the distance between the outer surface of the first layer and the neutral plane, and $r_m$ is an average value of the curvature radii at the time of occurring the delamination when the anti-counterfeiting apparatus is bent.

7. The anti-counterfeiting apparatus according to claim 1, wherein a guide portion which satisfies a condition for the radius of curvature r is formed on an upper portion of the third layer.

8. The anti-counterfeiting apparatus according to claim 5, wherein a guide portion which satisfies a condition for the radius of curvature r is formed on an upper portion of the third layer.

9. The anti-counterfeiting apparatus according to claim 1, wherein a guide portion which satisfies a condition for the radius of curvature r is formed inside the first layer.

10. The anti-counterfeiting apparatus according to claim 5, wherein a guide portion which satisfies a condition for the radius of curvature r is formed inside the first layer.

11. An anti-counterfeiting authentication method comprising:

applying an external force to the anti-counterfeiting apparatus of claim 1 so as to form corrugations in the second layer and the third layer;

respectively forming corrugations having a different wavelength in the second layer and the third layer while a buckling effect appears due to different stress distributions and surface strains of the respective layers depending on a difference in the Young's modulus; and determining whether there is forgery through images formed by expressing different structural colors due to incident lights in the high-corrugation region and the low-corrugation region on the first layer where grating structures of different shapes are formed by an arrangement of the corrugations.

* * * * *